July 27, 1965 W. LEPPER 3,196,579
MAGNETIC BUILDING ELEMENTS WITH PROTECTIVE MEANS
Filed Nov. 30, 1962 2 Sheets-Sheet 1
Fig. I
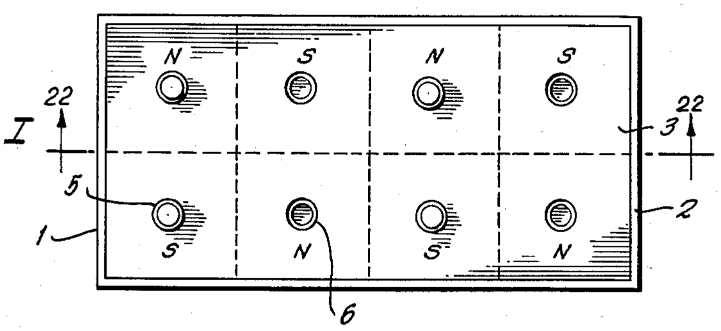
Fig. II
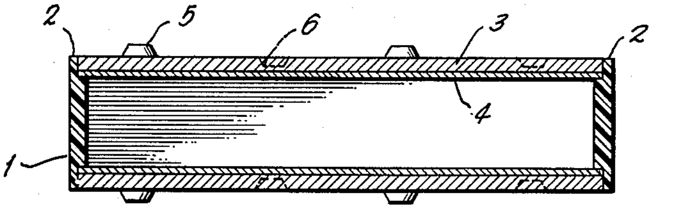
Fig. III
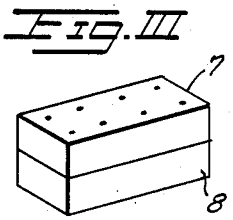
Fig. IV
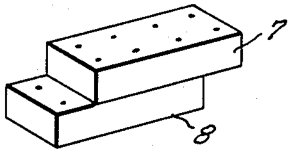
Fig. V
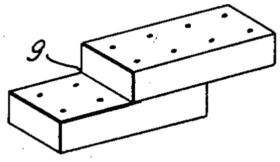
Fig. VI
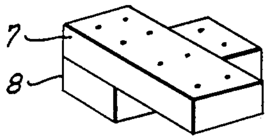
Fig. VII
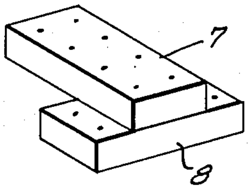
Fig. VIII
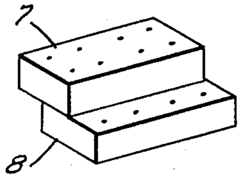
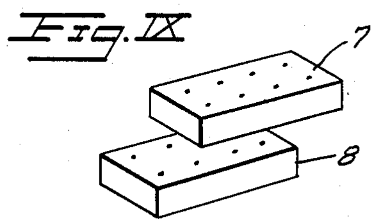
Fig. IX
INVENTOR
Wilhelm Lepper MAGNETIC BUILDING ELEMENTS WITH PROTECTIVE MEANS
Filed Nov. 30, 1962 2 Sheets-Sheet 2
FIG. X.
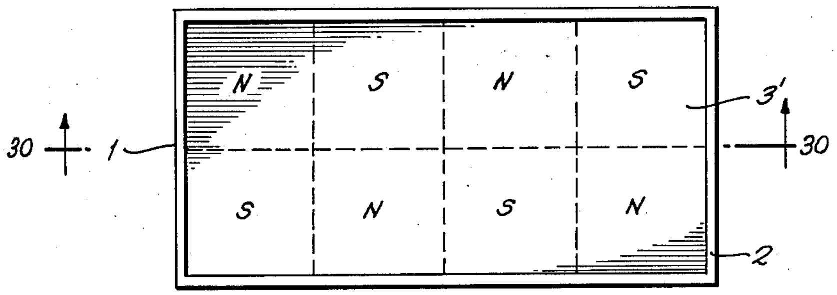
FIG. XI.
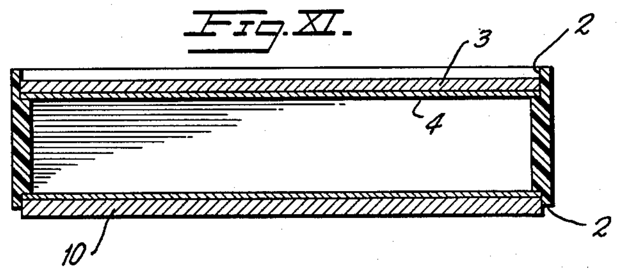
FIG. XII.
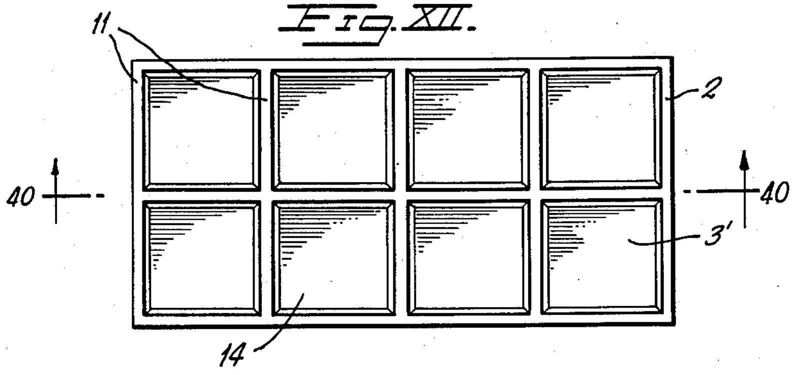
FIG. XIII.
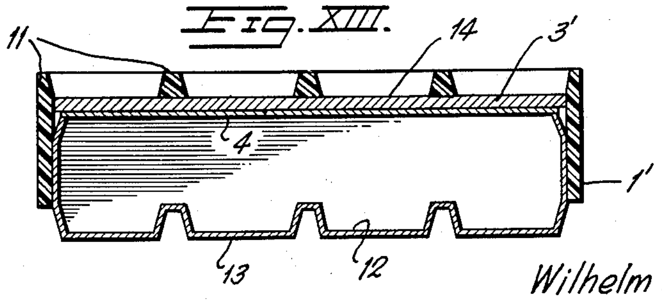
INVENTOR
Wilhelm Lepper United States Patent Office 3,196,579

Patented July 27, 1965

3,196,579
MAGNETIC BUILDING ELEMENTS WITH PROTECTIVE MEANS

Wilhelm Lepper, Bad Honnef, Germany, assignor to Beli-Finanz G.m.b.H., Zug, Switzerland, a corporation of Switzerland Filed Nov. 30, 1962, Ser. No. 241,385
Claims priority, application Germany, Jan. 18, 1962, L 40,990
3 Claims. (Cl. 46—25)

The manufacture of building elements in such a manner that they adhere to each other by means of magnetic force has become known from various sources. The simplest way would be to make them entirely of magnetic material. A patent relating to this method was in fact already applied for (German Patent No. 1,063,946). Building elements (building blocks or stones) thus manufactured, however, present the shortcoming that (1) They become so expensive that a commercial utilization can scarcely be considered since the base material (steel or aluminum-nickel-cobalt or other alloys as well as barium ferrite) is even itself expensive and on account of its high specific gravity requires very much material; and (2) The heavy weight is ill-suited for building blocks, especially for the play of younger children.

Therefore, blocks of plastic material or building elements made of other non-magnetic material, e.g. wood, were proposed in which the magnetic materials are inserted or embedded as bars, striplets or also as powder or shavings. The term "striplet" is herein used to define a thin strip of magnetic material having appreciable dimensions in width and length as opposed to the thickness of the strip. In these manufacturing methods, too, either the material or the processing and utilization are too expensive. This applies when bar magnets are embedded in all cases. Striplets in which the magnetic force is to act not lengthwise but transversely to the material cannot, as a practical matter, be made of steel or nickel-cobalt or other metal alloys because, due to the relatively low coercive force thereof and the strong induction between the poles, it is necessary to provide a minimum longitudinal extension which is a multiple of the square root of the pole face. Unless this is the case, the individual magnet elements are automatically demagnetized and thus become inefficient within a short time.

For the latter reasons it is advisable to use barium ferrite which in contrast to the aforementioned magnet materials presents very strong coercive forces and low inductions. This results in an inversion of the ratio of the distance between the poles and the pole face itself. It is generally only ¼ or ⅕ of the square root of the pole face.

If sintered barium ferrite magnets are employed it is necessary to take into account the fact that these magnet elements are extremely brittle and their edges are very fragile. If strip-shaped sintered barium ferrite magnets are employed, the break of the entire striplet must be expected. If barium ferrite powder, shavings, or the like are embedded in plastic material, the surface remains not only soft but also brittle, so that corners and edges break off very easily. Building elements thus constructed are extremely sensitive to scratching and other damages.

The embedding of individual magnets or magnet pieces in such a way that the magnet poles are kept completely even and level with the building element surface is a difficult, if not completely impossible, manufacturing process, Subsequent grinding again involves high expenses. It is however, important that the magnet poles abut against the adjacent magnet or iron poles with only very small air gaps if a minimum adhesive force is to be produced. Even an air gap of 0.01 mm. decreases the adhesive force by several percent. It drops to values which are impractical when the air gap or gaps have a width of tenths of 1 mm. or more.

All these disadvantages are overcome by the building element of the present invention.

The advantages of the present invention will appear from the following description taken in conjunction with the drawings wherein:

FIG. I is a plan view of one embodiment of the building element of the present invention;

FIG. II is a sectional view taken along the lines 22—22 of FIG. I;

FIGS. III through IX are schematic views of the various mating arrangements with a plurality of blocks of the type shown in FIG. I;

FIG. X is a plan view of a modification of the present invention;

FIG. XI is a sectional view taken along the lines of 30—30 of FIG. X;

FIG. XII is a plan view of a further modification of the present invention; and

FIG. XIII is a sectional view taken along the lines 40—40 of FIG. XII.

The material composed in a certain proportion of barium ferrite powder and a plastic material is shaped as desired by die casting, pressing or the like, and after hardening or cooling off presents a smooth surface with precise dimensions. This striplet is placed on an iron striplet as magnetic return path, whereby the adhesive force is almost doubled. The surface of the ferrite striplet may now be provided with elevations and recesses engaging each other, so that a displacement parallel to the surface is no longer possible and a fixation precise as to surfaces and edges, perpendicular to the magnet surface, is achieved for the outer edges of the building element. There are, however, other ways to accomplish this, e.g. by embedding the surface of the ferrite striplet into the plastic material element in such a way as to produce edges which somewhat project over the striplet surface. Elevations and recesses may also be produced by superposed case-like structures. The result achieved by means of the latter procedure is that the magnetized surface cannot be damaged. The elevations and recesses provided in or upon the magnet striplet may suitably also be protected by applying thereto a thin metal or plastic material layer, e.g. by evaporation, spreading, or sprinkling, or other known methods. It must, however, in each case be so thin that the adhesive force is not substantially impaired. This is feasible without difficulties since said layer possibly needs to have a thickness of merely a few thousandths mm. and at most not more than 1/100 mm. Thus the air gaps remain so small that the adhesive force is practically not affected.

The elements facing each other which engage these recesses and adhere thereto by magnetic force can be inexpensively made of ordinary iron and do not wear out. When these iron elements in addition are provided with a galvanic coating, corrosion is prevented and the attractive appearance is preserved.

The building elements, on the other hand, may be hollow with very thin walls of about 1 mm. This presents not only the advantage that expensive material is saved, but particularly that the children, when playing and throwing, hurt neither themselves nor others, nor can they damage the building elements themselves.

By embedding the magnet striplet on or in a grid or grate a case-shaped surface is formed in which the countermagnets or iron striplets are arranged and centered in such a way that a full utilization of the magnetic adhesive force and also a good centering is achieved. This is important for the model buildings to be constructed, in order to produce smooth, practically gapless walls and edges. Nothing impairs such a model more than the failure of the individual elements to fit exactly on each other. In building elements with magnet barlets or striplets that are merely inserted, fused in or otherwise arranged in plastic material, there will always be a displacement, though small, because, due to the friction between the adhering surfaces, very rarely can an exact congruence of the edges be achieved. In the present invention, this is practically impossible. Surfaces and edges as desired by the mason or architect are produced.

Since the maximum adhesive force prevails only in the direction of the magnetic field while in the direction perpendicular thereto, i.e. parallel to the surface, it drops to less than one tenth, other magnetic building elements or model buildings easily drop apart because lateral displacements cannot be prevented. In building elements of the present invention this is efficiently avoided. The buildings remain very stable.

FIG. I shows the surface and FIG. II the cross section of such a building element. For greater clarification of the distribution of the poles, it is assumed that the proportion between length and width of the building element is 2:1. It is, however, also feasible to manufacture building elements with a square surface or building elements which present only ¼ of the element shown in FIG. I. On the other hand, building elements with 10, 12, 16 or more poles may be employed, even if they have no quadrangular surface but are shaped e.g. with angles or inclinations.

In FIG. I, numeral 1 indicates the plastic frame with an edge 2 which serves to protect the edges of the barium ferrite magnet striplet 3 on all sides and simultaneously to retain it in frame 1. Under magnet striplet 3 an iron striplet 4 is provided which serves to form a better magnetic return path. It was found that thereby the adhesive strength can almost be doubled. On the surface of the barium ferrite striplet small truncated cone-shaped elevations and recesses are provided precisely fitted to the recesses and elevations of the next block. In this case identical magnet striplets are provided on the upper as well as lower surface of the building elements which are magnetized and provided with elevations and recesses in such a way that the upper and lower sides are symmetrical. This makes it possible to arrange the building in any position with respect to each other determined by the poles.

All combinations indicated in FIGS. III, IV, V, VI, VII, VIII, and IX can be produced.

In FIG. III, building element 7 rests in precise alignment of the edges on building element 8.

In FIG. IV, building element 7 is displaced with respect to building element 8 by a quarter of the surface. This is achieved by turning, in contrast to FIG. III, one of the building elements 7 or 8, so that a north pole again covers a south pole.

In FIG. V, the position of the two building elements with respect to their poles is the same as in FIG. III, but displaced by a half length, so that possibly a building element can be transversely arranged at 9, as in FIG VI.

In FIG. VI, building element 7 rests with the edges precisely aligned, but perpendicularly, on building element 8, while in FIG. VII building element 7 rests in the middle on building element 8.

In FIG. VIII, building element 7 is lengthwise displaced above building element 8 by one pole, while in FIG. IX this displacement is lengthwise as well as lateral.

It is obvious that by suitable selection of the poles and therewith of the elevations and recesses a multiplicity of combinations can be arrived at.

In FIGS. X and XI a different arrangement is provided for the protection of the magnet striplet: the edge 2 projects somewhat beyond the magnet striplet 3′ so that when this building element is placed upon a base plate or a table, the magnet striplet itself does not come in contact with this base plate surface. It is then naturally necessary that the opposite side 10 somewhat projects beyond the edge. If this striplet 10 is made of barium ferrite, it must be provided with an unwearable surface of metal or plastic material, as already mentioned. This striplet, however, could also consist of ordinary iron and adheres then in the known manner to the ferrite striplet 3′. It is prevented from lateral displacement by the edge 2. The various positions of the building elements with respect to each other as in FIGS. IV to IX, however, can only be produced by providing the projecting edge 2 at specific points with notches.

The surface of the ferrite lamina itself, provided with elevations and recesses, results in a gradual wear-off and soiling of these elevations during use so that they become inoperative after a short time. In the device of the present invention the surface of the ferrite lamina is inserted in the plastic material or arranged beside it or therein in such a way so as to produce edges which either protrude somewhat over the lamina surface or rest against the lamina edges, or project beside the lamina or laminae in the plastic material. It is also possible to produce elevations and recesses by means of caselike structures or recesses arranged above or laterally to the lamina. By means of the last-mentioned method, damages to the magnetized surface are rendered impossible.

FIGS. XII and XIII show by way of example such an arrangement for this protection of the magnet laminae and a fixation with precise fitting of surfaces and edges. The plastic frame 1′ is provided on one side with a grid or grate 11, which e.g. may be 2 mm. high or of such height that in each case an exact engagement and a good protection of the magnet striplet 3 is provided. This magnet striplet 3 is inserted at the opposite side on which there is no grid or grate and is pressed, together with the superposed magnetic return path striplet 4, against the grid or grate by a waffle-shaped counter element 12. This counter element 12 is then retained in the plastic material frame 1′ by engaging, gluing or another known method. This counter element 12 may consist of a thin iron element which is waffle-shaped so that the surfaces 13 fit in the case-shaped recesses 14 of the opposite side. By means of this arrangement it is possible to produce e.g. all combinations of building elements in FIGS. III to IX. By employment of iron instead of a countermagnet a greater freedom of arrangement is allowed because the iron particles fit on any pole, and a north pole need not always be placed upon a south pole, as is necessary in the case of FIGS. I and II.

I claim:

1. A toy building block comprising,
- a frame of non-magnetic material,
- a permanent magnet plate secured within said frame,
- a grid structure of non-magnetic material overlying said permanent magnet plate, said permanent magnet plate and grid structure together forming one exterior face of said block, said frame and grid structure together constituting means protecting said plate from blows and abrasion,
- an element having a waffle-like exterior surface secured within said frame said surface providing a face of said block positioned oppositely to said one face, said element being of a material and shape to constitute means which is magnetically attracted to said permanent magnet plate and which will mate with an opposed said one face of a similar toy block.

2. The toy block of claim 1 wherein said element is made of iron.

3. The toy block of claim 1 further comprising an iron plate adjacent said permanent magnet plate on the opposite side thereof from said grid structure.

References Cited by the Examiner

UNITED STATES PATENTS

| | | | |
|---|---|---|---|
| 879,455 | 2/09 | Frost | 46—25 |
| 2,262,199 | 11/41 | Paulson | 46—25 |

| | | | |
|---|---|---|---|
| 2,389,298 | 11/45 | Ellis. | |
| 2,570,625 | 10/51 | Zimmerman et al. | 46—24 |
| 2,951,703 | 9/60 | Arnold | 46—241 X |
| 2,983,071 | 5/61 | Oliver | 46—241 X |
| 3,095,668 | 7/63 | Dorsett | 46—25 |

FOREIGN PATENTS

| | | |
|---|---|---|
| 1,071,555 | 12/59 | Germany. |

RICHARD C. PINKHAM, *Primary Examiner.*